United States Patent [19]

Olbrich et al.

[11] 4,112,978
[45] Sep. 12, 1978

[54] VALVE FOR AN OPENING OF A PRESSURE VESSEL

[75] Inventors: Gottfried Olbrich, Bietigheim; Wilhelm Weigert, Schwieberdingen, both of Fed. Rep. of Germany

[73] Assignee: Robert Bosch GmbH, Stuttgart, Fed. Rep. of Germany

[21] Appl. No.: 797,794

[22] Filed: May 17, 1977

[30] Foreign Application Priority Data

Aug. 4, 1976 [DE] Fed. Rep. of Germany ....... 2634945

[51] Int. Cl.² .................................. F16L 55/04
[52] U.S. Cl. .................................. 138/30; 137/504; 251/24; 251/282
[58] Field of Search ............... 137/504; 138/30, 31; 251/282, 24

[56] References Cited

U.S. PATENT DOCUMENTS

| 1,907,162 | 5/1933 | Webb | 137/504 |
|---|---|---|---|
| 2,345,124 | 3/1944 | Huber | 138/30 |
| 3,038,501 | 6/1962 | Greer | 138/30 |
| 4,067,360 | 1/1978 | Zirps | 138/30 |

FOREIGN PATENT DOCUMENTS 2,322,925  11/1974  Fed. Rep. of Germany ........... 137/504

*Primary Examiner*—Robert G. Nilson
*Attorney, Agent, or Firm*—Michael J. Striker

[57] ABSTRACT

A valve for an opening of a pressure vessel has a body member defining a fluid flow passage having an inlet and an outlet. The body member is movable between an open position in which the inlet communicates with a hollow of the vessel so that a fluid enters the inlet of the valve and is discharged from the outlet thereof, and a closed position in which the inlet is discommunicated from the hollow of the vessel and the fluid does not enter the valve. The fluid exerts during its flow through the passage a component of force upon the body member which tends to prematurely urge the latter into the closed position. An arrangement is provided for accelerating the discharge of the fluid through the outlet of the valve in the open position so as to prevent premature movement of the body member into the closed position under the action of the fluid. The above arrangement may be in form of formations reducing a cross-sectional area of the outlet of the valve, which formations may be formed in the body member and/or in a wall of a housing surrounding the body member.

15 Claims, 2 Drawing Figures

U.S. Patent  Sept. 12, 1978  4,112,978
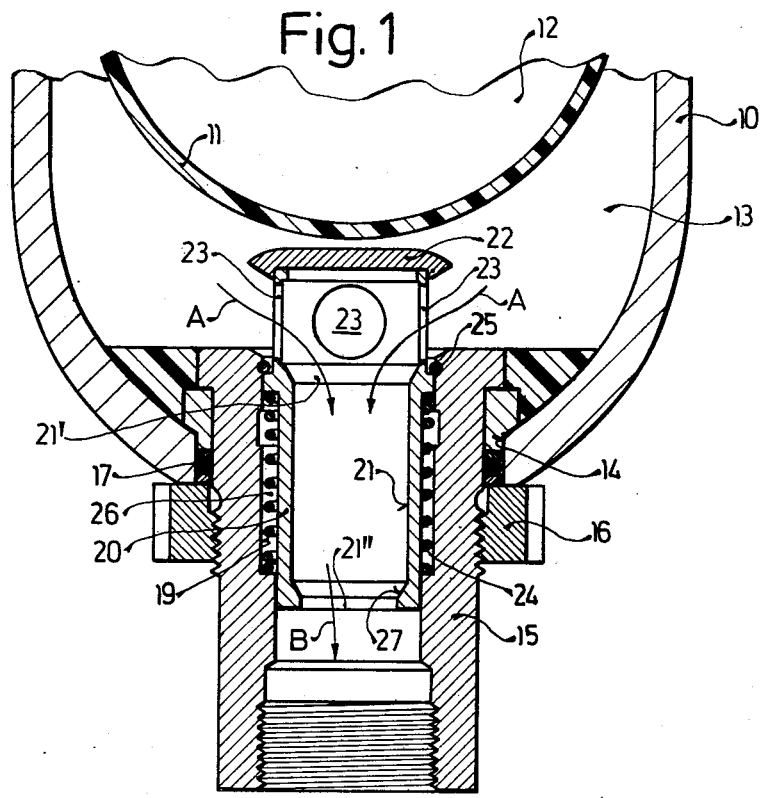

VALVE FOR AN OPENING OF A PRESSURE VESSEL

BACKGROUND OF THE INVENTION

The present invention relates to a valve for an opening of a pressure vessel. More particularly, it relates to a valve for such pressure vessel which has a housing and a resiliently deformable partition wall — e.g. a diaphragm — located in the housing and forming two compartments so that one of the compartments is filled with a liquid and has an opening in which latter the valve is mounted.

Valves for pressure vessels have been proposed each having a movable body member that is urged into a closed position by the resiliently expanded partition wall and urged into an open position by a spring acting in a direction substantially opposite to the direction in which said partition wall acts. It has, however, been recognized that when the liquid enters an outflow passage defined or in part bounded by the body member, at great speed, it exerts a component force upon the body member which tends to prematurely urge the latter into the closed position. Taking this into consideration, means have been proposed for preventing premature movement of the body member into the closed position, including a stem formed in the portion of the body member located in the pressure vessel and a passage provided in said portion so that the liquid flows through the passage, reacts against an inner end of the stem and provides a force operatively reacting against a valve head and urging the body member into an open position. While it is true that the above construction reliably performs its functions of preventing premature closing of the valve, it is very complicated and expensive.

SUMMARY OF THE INVENTION

Accordingly, it is a general object of the present invention to provide a valve for an opening of a pressure vessel which avoids the disadvantages of the prior art valves.

More particularly, it is an object of the present invention to provide a valve for an opening of a pressure vessel, which valve is simple in construction and less expensive than the known valves of this type.

Still another object of the present invention is to provide a valve for an opening of a pressure vessel, having means for preventing premature closing of the valve. The construction costs of this valve should only insignificantly exceed the construction costs of the known valves without such means.

In keeping with these objects and others which will become apparent hereinafter, one feature of the present invention is that the valve having a body member defining a fluid flow passage with an inlet and an outlet, is provided with means for accelerating the discharge of the fluid through an outlet of the valve in an open position of the latter. As mentioned above, when the fluid, such as for instance a liquid, is discharged from a pressure vessel and enters the fluid flow passage, it exerts upon the body member a force whose axial component tends to move the body member into the closed position. When the fluid enters the inlet of the valve at a substantial speed the above component exceeds the counteracting force of a spring biasing the body member towards the open position, and thus generated pressure differential can close the valve before the discharge of fluid from the vessel is completed. However, when in accordance with the present invention the above means for accelerating the discharge of the fluid through the outlet are provided, they increase the "discharge impulse" which latter acts opposite to the above component of force that urges the body member towards the closed position and thus compensates for this component of force. The spring therefore firmly retains the body member in the open position by its entire predetermined strength.

Another feature of the present invention is that the means for accelerating the discharge of the fluid are formations which reduce the cross-sectional area of the outlet of the fluid flow passage as compared with the cross-sectional area of the remainder of the passage upstream of the outlet. The thus constructed means are extremely simple so that the construction costs of the valve in accordance with the invention only insignificantly exceed the construction costs of the prior-art valves which are not provided with the above means.

When the body member is hollow, the above formations may include a projection which extends inwardly from an inner surface of a wall of the body member. When the body member is formed as a substantially pin-shaped member, the above formations may include an enlarged portion of the pin-shaped member and/or an inwardly extending projection on a wall of a housing surrounding the pin-shaped member. The enlarged portion of the pin-shaped member may be conical, for instance double-conical, whereas the projection of the wall of the housing may be annular, for instance, toroidal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a longitudinal section of a valve having a hollow body member, and of a portion of a pressure vessel accommodating the valve in accordance with the invention; and FIG. 2 is a longitudinal section of a valve having a pin-shaped body member, in accordance with another embodiment of the present invention.

DESCRIPTION OF THE PREFERRED EMBODIMENTS

FIG. 1 shows a valve in accordance with one embodiment of the invention, and a pressure vessel with an opening in which the valve is mounted. The pressure vessel has a casing 10 and a resiliently deformable partition (e.g. diaphragm) 11 dividing the housing 10 into a gas compartment 12 and a liquid compartment 13. An opening 14 is provided in a lower part of the casing 10 and communicates with the liquid compartment 13.

A pipe 15 is mounted in the opening 14, which pipe is tightly clamped in the casing 10 of the pressure vessel by a nut 16 and sealed by a gasket 17. The pipe 15 may be inserted in the casing 10 of the pressure vessel to a length corresponding to substantially one third of the length of the pipe and has a through hole 19 in which latter a body member 20 of the valve is movably located. The body member 20 shown in FIG. 1 is formed as a hollow member provided with a through hole 21 which forms a fluid flow passage having an inlet 21' and an outlet 21". The through hole 21 of the body member 20 is closed from above by a valve head 22 which is fixedly connected to member 20 and located in the liquid compartment 13 of the pressure vessel. When the partition 11 is deformed, it urges the valve head 22 downward and thereby the body member 20 moves into closed position. Several substantially radial bores 23 are provided in an upper portion of the body member 20 below the valve head 22, which bores 23 communicate a hollow of the liquid compartment 13 of the pressure vessel with the inlet 21' of the fluid flow passage when the valve is in its open position.

The through hole 19 of the pipe 15 has an upper enlarged portion so that an annular groove 26 is formed between the inner surface of a wall of the above enlarged portion of the through hole 19 and the outer surface of the body member 20. A spring 24 is located in the groove 26 and urges the body member 20 upwardly into the open position until the member 20 abuts against a fixed stop 25 located in the through hole 19.

In accordance with the present invention, means are provided for accelerating the discharging of the liquid through the outlet 21". In the embodiment shown in FIG. 1 such means are formed as an annular projection 27 extending inwardly from a wall portion of the body member 20 adjacent to the outlet 21". The thus formed annular projection reduces the cross-sectional area of the outlet 21" as compared with the cross-sectional area of the remainder of the fluid flow passage upstream of the outlet and thereby provides for accelerating the discharging of the liquid through the outlet 21".

FIG. 2 shows only the valve in accordance with another embodiment of the present invention. The pressure vessel is identical to that shown in FIG. 1 and is not shown here. The valve comprises a hollow housing 30 having a through hole 31. A guide element 33 is located in the through hole 31 and is provided with several through holes 34. A body member of the valve is identified in toto by reference numeral 36. It is formed as a pin-shaped member and has a pin portion 35 extending through the guide element 33 so that the body member 36 is axially movable relative to the latter and thereby relative to the housing 30. The pin-shaped body member 36 and the housing 30 define therebetween a fluid flow passage. The thus formed passage has an inlet 31' communicating with a not-shown liquid compartment of the pressure vessel when the valve is in an open position, and an outlet 31" through which latter the liquid is discharged from the valve in such position.

A valve head 37 is fixedly connected to the body member 36 and adapted to close and to open the inlet 31' of the fluid flow passage. When a not-shown resiliently deformable partition (see FIG. 1) of the pressure vessel is expanded and presses against the valve head 37, the body member 36 is urged into the closed position. A spring 38 is located between the valve head 37 and the guide element 33 and urges the body member 36 into the open position.

Means are also provided for accelerating the discharging of the liquid through the outlet 31" of the valve; such means are formed as formations reducing the cross-sectional area of the outlet 31". In accordance with this embodiment, such formations include an enlarged portion 39 of the body member 36 and a projection 32 projecting from an inner surface of a wall of the housing 30. The enlarged portion 39 is conical, for instance, double-conical. The projection 32 is annular, for instance, toroidal. It is understood that the above formations may be formed either by the enlarged portion 39 or by the projection 32. When the above formations are provided, the cross-sectional area of the outlet 31" is reduced as compared with the cross-sectional area of the remainder of the fluid flow passage upstream of the outlet and therefore the discharge of the liquid through the outlet 31" is accelerated.

The valve in accordance with the present invention operates as follows (reference numerals in parentheses refer to FIG. 2):

When the resiliently deformable partition 11 of the pressure vessel is not expanded and does not press against the valve head 22 (37) the spring 24 (38) will urge the body member 20 (36) upwardly into the open position. In such position the inlet 21' (31') of the fluid flow passage communicates with the liquid compartment 13 of the pressure vessel, the liquid is discharged from the same, enters the valve through the inlet 21' (31') as indicated by the arrows A, and thereafter is discharged from the valve through the outlet 21" (31") as indicated by the arrows B. Even though an axial component of the force exerted by the liquid entering the inlet 21' (31') tends to urge the body member 20 (36) into the closed position, the accelerated discharge of the liquid through the outlet 21" (31") increases the "discharge impulse" which acts opposite to the above component of force and thus compensates for this component of force. The spring 24 (38) therefore firmly retains the body member 20 (36) in its open position. When the resiliently deformable partition 11 is expanded and presses against the valve head 22 (37), the body member 20 (36) will move downwardly into its closed position and the inlet 21' (31') is discommunicated from the liquid compartment 13 of the pressure vessel.

In both embodiments of the present invention means may be provided for dampening the movement of the body member 20 (36) of the valve during its final period. Such means are shown in FIG. 2 and may be formed as a flange section 40 provided adjacent to the enlarged portion 39 of the body member 36 and insertable in a hole 41 of the guide element 33.

It will be understood that each of the elements described above, or two or more together, may also find a useful application in other types of constructions differing from the types described above.

While the invention has been illustrated and described as embodied in a valve for an opening of a pressure vessel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A pressure device comprising a hollow vessel having an outlet for discharging fluid therefrom, said outlet being provided with a valve seat; a valve member slidably mounted in said vessel above said valve seat for movement between an open position in which it permits fluid to discharge through said outlet and a closed position in which it prevents fluid from discharging through said outlet, said valve member being provided with a portion facing towards and corresponding to said valve seat and operative for fittingly engaging said valve seat when the valve member is in said closed position, said fluid exerting during its flow through said outlet a component of force upon said portion which tends to prematurely force said valve member into said closed position; resilient means for urging the valve member into said open position; and means for accelerating the discharge of said fluid through said outlet of said vessel in said open position, to thereby prevent premature movement of said valve member into said closed position under the action of said fluid.

2. The device as defined in claim 1; wherein said urging means including a spring urging said body member in a second direction substantially opposite to said first direction.

3. The device as defined in claim 1, wherein said accelerating means are formations reducing a cross-sectional area of said outlet of said fluid flow passage as compared with the cross-sectional area of the remainder of the latter.

4. The device as defined in claim 3, wherein said valve member is a hollow member having a circumferential wall, said formations including at least one projection extending inwardly from said circumferential wall of said hollow member.

5. The device as defined in claim 4, wherein said valve member has a head portion facing towards said hollow of said vessel, and at least one opening located between said head portion and the remainder of the valve member and communicating said outlet of said fluid flow passage with said hollow of said vessel in said open position.

6. The device as defined in claim 5, wherein said valve member has an axis and said one opening extends in a direction substantially transverse to said axis.

7. The device as defined in claim 3; and further comprising a housing having a wall, said valve member being a pin-shaped member located within said housing so that said fluid flow passage is defined between an outer surface of said pin-shaped member and an inner surface of said wall of said housing, said pin-shaped member having at least one portion of a cross-sectional area exceeding the cross-sectional area of the remainder thereof which one portion forms said formations so that said outlet of a reduced cross-sectional area is formed between an outer surface of said one portion of said pin-shaped member and the inner surface of said wall of said housing.

8. The device as defined in claim 3; and further comprising a housing having a wall, said body member being a pin-shaped member located within said housing so that said fluid flow passage is formed between an outer surface of said pin-shaped member and an inner surface of said wall of said housing, said wall of said housing having at least one projection extending inwardly therefrom and forming said formations so that said outlet of a reduced cross-sectional area is formed between the outer surface of said pin-shaped member and an inner surface of said one projection of said wall of said housing.

9. The device as defined in claim 3; and further comprising a housing having a wall, said valve member being a pin-shaped member located within said housing so that said fluid flow passage is defined between an outer surface of said pin-shaped member and an inner surface of said wall of said housing, said pin-shaped member having at least one portion of a cross-sectional area exceeding the cross-sectional area of the remainder thereof, said housing having at least one projection extending inwardly from said wall thereof, said formations being formed by said one portion of said pin-shaped member and said one projection of said wall of said housing so that said outlet of a reduced cross-sectional area is formed between an outer surface of said one portion of said pin-shaped member and an inner surface of said one projection of said wall of said housing.

10. The device as defined in claim 9, wherein said projection of said wall of said housing is annular.

11. The device as defined in claim 9, wherein said projection of said wall of said housing is toroidal.

12. The device as defined in claim 9, wherein said one portion of said pin-shaped member is conical.

13. The device as defined in claim 9, wherein said one portion of said pin-shaped member is double-conical.

14. A device as defined in claim 1, and further comprising a flexible partition in said vessel subdividing the interior thereof into a gas-containing compartment and a liquid-containing compartment which communicate with said outlet.

15. A device as defined in claim 14, wherein said partition is displaceable, on expansion of gas in said gas compartment, into an extended position immediately adjacent said outlet, so as to engage said portion and urge said valve member into said closed position.

* * * * *